Patented Nov. 27, 1951

2,576,349

UNITED STATES PATENT OFFICE 2,576,349

WATER - SOLUBLE SULFUR - CONTAINING ORGANIC MERCURY COMPOUNDS HAVING DIURETIC PROPERTIES AND PROCESS FOR PREPARING SAME

Robert A. Lehman, New York, N. Y., assignor to Wyeth Incorporated, Philadelphia, Pa., a corporation of Delaware Application January 11, 1949, Serial No. 70,381

13 Claims. (Cl. 260—431)

The present invention relates to sulfur-containing organic mercury compounds and to a process for preparing the same, and more particularly relates to sulfur-containing organic mercury compounds having improved therapeutic properties when used as diuretics.

Heretofore, in the field of mercurial diuretics, compounds have been employed having the general formula

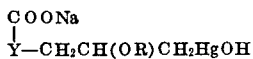

wherein R is hydrogen or methyl and the nature of Y seems relatively unimportant and has been widely varied. Examples of the Y residue known to the prior art include camphoramic, N-carbamyl succinamic, 2-carboxy-3-carbamyl pyridine, 3-carboxy-coumarin, phthalamic, phenoxy acetic, ortho-carbamyl-phenoxy-acetic, 2-pyridone-5-carboxylic acids, in most cases the mercury bearing side chain being attached through a nitrogen atom. The Y grouping may also consist in a moiety which is inherently water soluble such as the sodium salt of barbital.

While compounds having the above general formula are very effective diuretics, their usefulness may be considerably enhanced by the addition of a mole equivalent of theophylline. This enhancement is manifested by a slight increase in diuretic potency and by marked diminution in local tissue toxicity. The advantages of the combination of the basic mercurated organic acid with theophylline are so well known and accepted in the field of mercurial diuretics that theophylline up until now has been included in practically all the commercially available products.

In the preparation of these drugs, the chemical combination of the mercurated organic acid with theophylline is ordinarily produced by dissolving the theophylline in an aqueous solution of the sodium salt of the acid. Reaction is believed to take place according to the following equation:

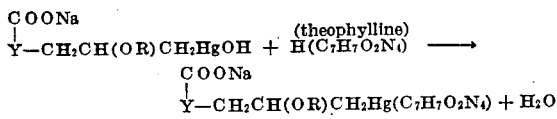
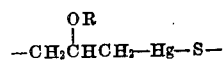

The end product of this reaction may be considered as a slightly ionized complex which is in accordance with the well-known tendency of mercury to form slightly ionized salts.

Prior to the recent introduction of my new diuretic compound there has been no mercurial diuretic having a basic structure different from that indicated in both of the formulas set forth above which has enjoyed the general acceptance of the medical profession. That is to say all of the other mercurial diuretics on the market today have included the group $-CH_2CH(OR)CH_2HgOH$ or the product obtained therefrom where the theophylline group $-(C_7H_7O_2N_4)$ is substituted for the hydroxyl group attached to mercury.

The diuretic effectiveness of the above mentioned mercurial diuretics (either with or without theophylline) is such as to leave little to be desired. In fact any greater potency might constitute a drawback rather than an advantage. However, they possess in common one liability. They will, in occasional individuals, act upon the heart in such a manner as to produce ventricular tachycardia or ventricular fibrillation. In such individuals, an injection of the mercurial diuretic immediately produces exceedingly alarming symptoms which either rapidly pass off or terminate in death.

A number of cases of sudden death attributable to these prior diuretics have been reported in the literature and one drug has been removed from the market as a result. Experimental work has been going on for some time in an attempt to discover the reason and to devise a method for preventing their occurrence. In this connection, see "The acute toxicity of mercurial diuretics" by Arthur C. De Graff and Robert A. Lehman, "Journal of the American Medical Association, July 25, 1942, vol. 119, pp. 998–1001"; and "A review of the toxic manifestations of mercurial diuretics in man" by Arthur C. De Graff and J. Ernest Nadler, Med. D. Sc., "Journal of the American Medical Association, July 25, 1942, vol. 119, pp. 1006–1011."

With the disadvantages of the prior art mercurial diuretics in mind, it is the primary object of the present invention to provide sulfur-containing mercury compounds which do not contain theophylline but which have the desired diuretic effectiveness and yet are free from an action on the heart producing ventricular tachycardia or ventricular fibrillation.

Another object of the invention is to provide a series of sulfur-containing mercurial diuretics, each of which is characterized by containing the group $$-CH_2CHCH_2-Hg-S-$$
$$\phantom{-CH_2C}|\phantom{HCH_2-Hg-S-}$$
$$\phantom{-CH_2CH}OR$$

wherein R is a substituent selected from the group consisting of hydrogen and a lower alkyl radical, said radical preferably containing not more than six carbon atoms, such as methyl, ethyl, propyl, or isopropyl.

A further object of the invention is to provide a series of sulfur-containing mercurial diuretics having the general formula $$(Z)-Y-CH_2\overset{\overset{\displaystyle OR}{|}}{C}H-CH_2-Hg-S-X$$

wherein Y is an organic moiety attached to the end carbon of the propyl group, R is a substituent selected from the group consisting of hydrogen and a lower alkyl radical, preferably containing not more than six carbon atoms, X is the residue of an organic sulfhydryl moiety which is attached to the rest of the molecule through linkage of the sulfhydryl sulfur atom with the mercury atom, and wherein Z is a water solubilizing substituent which may be omitted in the event the Y moiety is inherently water soluble. The Z grouping, when present, may consist of any suitable water-solubilizing substituent, such, for example, as any of the ammonium, alkali or alkaline earth metal salts of —SO₃H and —COOH.

It is a further and more particular object of the invention to provide sulfur-containing mercurial diuretics having the general formula set forth above, wherein the Y moiety contains a —CON= group and is attached to the end carbon of the propyl group through the nitrogen of such group, with the R substituent and the X moiety having the definitions given above. The —CON= group may be present as a side chain or as a part of a ring structure.

My investigations indicate that the X and Y moieties may be selected from an extremely wide range of compounds without adversely affecting the diuretic properties and freedom from cardiac toxicity which are among the outstanding characteristics of the new sulfur-containing organic mercury compounds of the present invention. The characteristic of freedom from cardiac toxicity appears to be due to the attachment of the second valence bond of the mercury atom to the X moiety through the relatively stable mercury to sulfur bond which does not at the same time bind the mercury so securely as to interfere with the diuretic action. The only other limiting factors as to the nature of the X and Y moieties that appear to require consideration are the molecular sizes of these moieties. These should not be so large as to unduly reduce the solubility of the compound or confer upon it colloidal properties. Compounds having molecular weights not exceeding 1,000 will, as a general rule, have satisfactory properties. Organic groupings which in themselves are associated with extraneous pharmacological actions will ordinarily be avoided in producing mercurial diuretics, but it may be observed in passing that the diuretic potency of the compounds of the present invention, as well as of the prior mercurial diuretics for that matter, is of such high order that the doses which are used by the medical profession are universally within the range 0.0007–0.0014 gm. of mercury per kgm. of body weight. Consequently, the introduction of such a grouping into the molecule would generally imply such a small dose level as to be without significance. Furthermore, the attachment of a mercurial diuretic side chain as a substituent on another drug would, in the great majority of cases, destroy its activity because most drugs, unlike the mercurials, depend for their action on the configuration of the molecule as a whole.

In the preparation of these new sulfur-containing mercurial compounds, I employ any suitable sulfur compound.

The following sulfur compounds are representative, to wit, sodium thiosulfate, potassium ethyl xanthate, sodium thioacetate, sodium thioglycollate, ethyl thioglycollate, sodium salt of cysteine, sodium thiosalicylate, thiophenol, thiourea, N-methyl thiourea, thioacetamide, thiouracil, sodium thiobarbiturate, 2-mercaptoethylpyridine, 2-mercaptobenzothiazole, 2-mercaptobenzoxazole, 2-mercaptothiazoline, and beta-thionaphthol.

In general, any sulfur compound is suitable in which the following typical reaction occurs:

—HgOH+QS—→—Hg—S—+QOH where Q is usually hydrogen, sodium or potassium.

In the preparation of the sulfur-containing mercurial diuretics for therapeutic use, it is convenient to add the desired sulfhydryl compound in molar equivalent amounts to an aqueous solution of the mercury compound which has been purified by the usual processes known to those skilled in the art.

The following reaction occurs:

—HgOH+HS—→—Hg—S—+H₂O or, in case the sodium mercaptide is employed, the reaction is, —HgOH+NaS—→—Hg—S—+NaOH Where the alkali metal mercaptide, such as NaS— or KS—, is employed in the reaction, the liberated sodium hydroxide or potassium hydroxide must be neutralized before the solution is used in therapeutics.

As a more specific example, to 20 cc. of a 0.1 molar solution of the sodium salt of N(gamma-hydroxy-mercuri-beta-methoxy-propyl)-d-alpha camphoramic acid, was added 0.316 gram (one mol equivalent) of anhydrous sodium thiosulfate. The pH of the solution which was initially 9.0, immediately rose to 10.6. The liberated sodium hydroxide was then titrated with tenth-normal hydrochloric acid, using the glass electrode to determine the pH after the addition of each increment of acid. As the acid was added the pH gradually fell. After 19.9 cc., the pH was 9.1; when 20.2 cc. had been added the pH dropped to 7.4. The appearance of this sharp inflection in the titration curve after the addition of approximately 20 cc. of acid clearly indicates that the reaction of the sodium thiosulfate with the mercury compound goes to completion as follows:

$$-HgOH + NaS-\overset{\overset{\displaystyle ONa}{|}}{\underset{\underset{\displaystyle O}{\|}}{S}}=O \longrightarrow -HgS-\overset{\overset{\displaystyle ONa}{|}}{\underset{\underset{\displaystyle O}{\|}}{S}}=O + NaOH$$

This experiment indicates that an exact mol equivalent of sodium hydroxide is liberated in this reaction.

In every case, the parent mercury compound includes the structure.

$$CH_2\overset{\overset{\displaystyle OR}{|}}{C}HCH_2-Hg-$$

and is usually the ammonium, alkali or alkaline earth metal salt of a carboxylic or sulfonic acid.

The sodium hydroxide liberated in the reaction illustrated as

—HgOH+NaS—→—Hg—S—+NaOH may, if desired, be employed in neutralizing this acid group as follows:

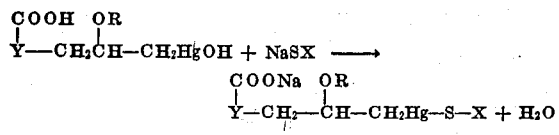

where Y, R and X have the definitions heretofore given them.

Certain of the sulfhydryl compounds contain the carboxylic acid group. In employing these compounds, it is desirable to prepare the alkali, alkaline earth, ammonium, substituted ammonium, or alkylene diamine salt of the sulfur compound before adding it to the solution of the mercury compound.

It is contemplated to include compounds in which the sulfhydryl group is present by virtue of tautomerism, such as thiourea, N-methyl thiourea, and the like.

It is important that the sulfhydryl compounds be in a high state of purity, although in many cases the commercially available products are satisfactory.

The following examples are illustrative of some of the many sulfur and mercury compounds which may be combined to form a product comprehended by this invention.

*Example I*

To 50 cc. of a carefully purified aqeous solution of the sodium salt of N(gamma-hydroxy-mercuri-beta-methoxy-propyl) - d - alpha-camphoramic acid containing 40 mgm. of mercury per cc. I added 10 cc. of a solution containing 1.14 grams (one mol equivalent) of sodium thioglycollate) and evaporated to dryness at room temperature and reduced pressure in the presence of a desiccant. The product is an amorphous white powder which decomposes at 156–8° C. (uncorr.), and which was found on analysis to have a mercury content of 33.0 per cent. A solution may be prepared for therapeutic use as described in Example VI.

This product formed by the reaction of sodium thioglycollate with the sodium salt of N(gamma-hydroxy-mercuri-beta-methoxy - propyl) - d - alpha-camphoramic acid has the following structure:

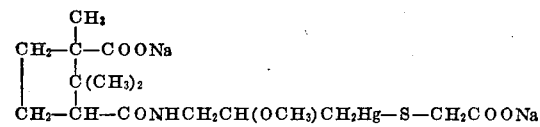

*Example II*

I prepared a solution of thiobarbituric acid by dissolving 1.44 grams (one mol equivalent) in boiling water and allowing to cool to 50° C. I added this solution slowly to 50 cc. of a carefully purified aqueous solution of the sodium salt of N(gamma-hydroxy-mercuri-beta-methoxy-propyl-d-alpha-camphoramic acid containing 40 mgm. of mercury per cc. A flocculent yellow precipitate formed immediately, which I filtered off, washed with water, and dried at 40° C. under reduced pressure. The product is an amorphous yellow powder, insoluble in cold water, which turns red in the melting point bath at 159° C. (uncorr.), chars at 203° C. (uncorr.), and it was found on analysis to have a mercury content of 31.7 per cent.

A solution may be prepared for therapeutic use by dissolving this compound in a mol equivalent of sodium hydroxide, and after suitably buffering, the concentration may be adjusted to 40 mgm. of mercury per cc.

The product formed by the reaction of sodium thiobarbiturate with the sodium salt of N(gamma-hydroxy-mercuri-beta-methoxy-propyl) - d - alpha-camphoramic acid has the following structure:

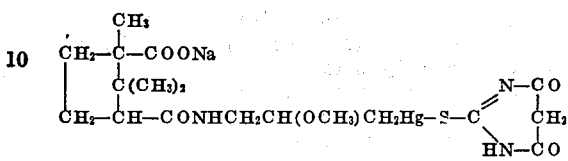

*Example III*

I added 4.88 grams of purified N(gamma-hydroxy-mercuri-beta-methoxy-propyl) - d - alpha-camphoramic acid to 300 cc. of absolute methyl alcohol in which had been suspended 1.58 grams (one mol equivalent) of pure anhydrous sodium thiosulfate, and stirred vigorously until all was dissolved. The resulting solution was poured into a small volume of anhydrous di-ethyl ether, and more ether added until a yellow precipitate formed. I continued to add ether, a small amount at a time, until the precipitate forming was white instead of yellow. This preliminary precipitate (which represents only a minor proportion of the reactants) was then filtered off and discarded, and the remaining solution which was clear and colorless, was thrown into a large volume of ether. The white precipitate thus thrown down was filtered off and dried at 40° C. under reduced pressure. The product is an amorphous, white hygroscopic powder, which decomposes at 134–136° C. (uncorr.), and which was found on analysis to have a mercury content of 29.1 per cent. A solution may be prepared for therapeutic use as described in Example VI.

This product formed by the reaction of sodium thiosulfate with N(gamma-hydroxy-mercuri-beta - methoxy-propyl) - d - alpha-camphoramic acid has the following structure:

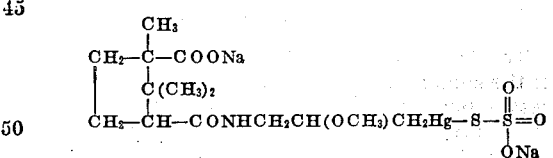

*Example IV*

I dissolved 1.10 grams (one mol equivalent) of thiophenol in 10 cc. of 50 per cent. ethyl alcohol and added it to 50 cc. of a carefully purified aqueous solution of the sodium salt of N(gamma-hydroxy - mercuri - beta-methoxy-propyl) - d-alpha-camphoramic acid which contained 40 mgm. of mercury per cc. I evaporated this solution to dryness at room temperature and reduced pressure in the presence of a desiccant. The product is an amorphous, slightly hygroscopic white powder, which melts at about 104° C. (uncorr.), and which was found on analysis to have a mercury content of 32.1 per cent. A solution may be prepared for therapeutic use as described in Example VI.

This product has the following structure:

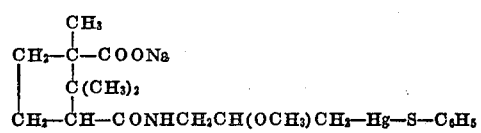

Example V

To 50 cc. of aqueous solution containing 1.60 grams (one mol equivalent) of potassium ethylxanthate I added 4.88 grams of N(gamma-hydroxy - mercuri-beta-methoxy-propyl) - d-alpha-camphoramic acid. After the acid was dissolved I filtered the solution and evaporated to dryness at room temperature and reduced pressure in the presence of a desiccant. The product is an amorphous yellow, hygroscopic powder which was found on analysis to have a mercury content of 28.1 per cent. A solution may be prepared for therapeutic use as described in Example VI.

This product has the following structure:

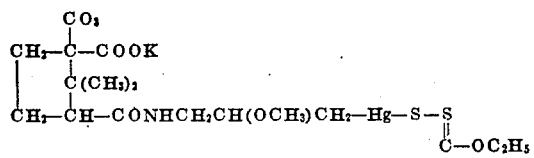

Example VI

To 50 cc. of a carefully purified aqueous solution of the sodium salt of N(gamma-hydroxy-mercuri-beta - methoxy - propyl) - d-alpha-camphoramic acid containing 40 mgm. of mercury per cc., I added 0.76 grams (one mol equivalent) of pure thiourea. When all was dissolved I evaporated the solution to dryness at room temperature and reduced pressure in the presence of a desiccant. The product is an amorphous white hygroscopic powder which was found on analysis to have a mercury content of 34.2 per cent.

In order to prepare a solution for therapeutic use this substance may be readily dissolved in water, suitably buffered, and the concentration adjusted to 40 mgm. of mercury per cc. which is the concentration usually used in therapeutics.

This product has the following structure:

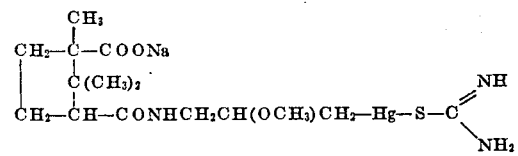

Example VII

To 50 cc. of a carefully purified aqueous solution of the sodium salt of N(gamma-hydroxy-mercuri-beta - methoxy-propyl) - d - alpha-camphoramic acid containing 40 mgm. of mercury per cc. I added 10 cc. of a solution containing 1.57 grams (one mol equivalent) of cysteine-hydrochloride, and 5 cc. of 2 N NaOH (two mol equivalents) and evaporated to dryness at room temperature and reduced pressure in the presence of a desiccant. The product is an amorphous white powder which contains a mol equivalent of NaCl, and was found on analysis to have a mercury content of 28.7 per cent.

As the presence in the compound of a mol equivalent of sodium chloride has no therapeutic significance, a solution for therapeutic use may be prepared as described in Example VI.

This product has the following structure:

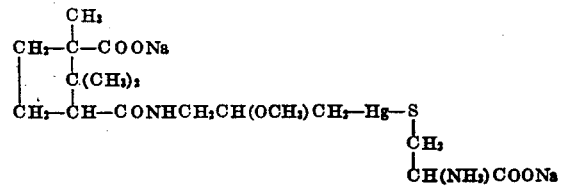

Example VIII

To 50 cc. of a carefully purified aqueous solution of the sodium salt of ortho N(gamma-hydroxy - mercuri-beta-methoxy-propyl) carbamyl phenoxy-acetic acid containing 40 mgm. of mercury per cc. I added 0.75 gram (one mol equivalent) of thioacetamide and filtered and decolorized with activated carbon as necessary. I then evaporated to dryness at room temperature and reduced pressure in the presence of a desiccant. The product is an amorphous white slightly hygroscopic powder which was found on analysis to have a mercury content of 34.7 per cent. A solution may be prepared for therapeutic use as described in Example VI.

This product has the following structure:

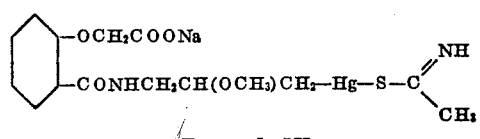

Example IX

To 50 cc. of a carefully purified aqueous solution of the sodium salt of ortho N(gamma-hydroxy - mercuri - beta - methoxy - propyl) carbamyl phenoxy-acetic acid containing 40 mgm. of mercury per cc. I added 10 cc. of an aqueous solution containing 1.14 grams (one mol equivalent) of sodium thioglycollate and evaporated to dryness at room temperature and reduced pressure in the presence of a desiccant. The product is an amorphous, pink, hygroscopic powder which melts at 121° C. (uncorr.), and decomposes with evolution of gas at 129° C. (uncorr.), and which was found on analysis to have a mercury content of 31.3 per cent. A solution may be prepared for therapeutic use as described in Example VI.

This product has the following structure:

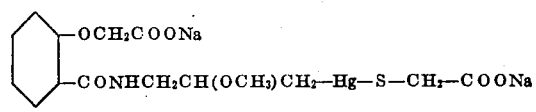

Example X

To a carefully purified aqueous solution containing 4.69 grams of the sodium salt of N(gamma - hydroxy - mercuri - beta - methoxy-propyl) N'-carbamyl succinamic acid I added 1.20 grams (one mol equivalent) of ethyl thioglycollate which had been dissolved in 10 cc. of 50 per cent. ethyl alcohol. I filtered the resulting solution, and evaporated to dryness at room temperature and reduced pressure in the presence of a desiccant. The product is an amorphous white, hygroscopic powder which was found on analysis to have a mercury content of 34.1 per cent. A solution may be prepared for therapeutic use as described in Example VI.

This product has the following structure:

Example XI

To 50 cc. of a carefully purified aqueous solution of the sodium salt of 2-carboxy-3-N-(gamma - hydroxy - mercuri - beta - hydroxypropyl) carbamyl pyridine containing 40 mgm. of mercury per cc., I added 10 cc. of a solution containing 1.14 grams (one mol equivalent) of sodium thioglycollate and evaporated to dryness at room temperature and reduced pressure in the presence of a desiccant. The product is an amorphous white powder which decomposes at 88°–91° C. (uncorr.), and which was found on analysis to have a mercury content of 35.1 per cent. A solution may be prepared for therapeutic use as described in Example VI.

This product has the following structure:

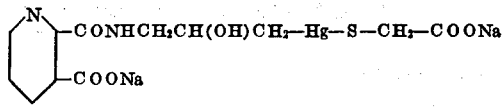

Example XII

By the same procedure as in Example VI, I prepared the sodium thiobarbiturate derivative of the sodium salt of N(gamma-hydroxy-mercuri - beta - ethoxy - propyl) - d - alpha - camphoramic acid using mol equivalent amounts of reactants. The product is an amorphous yellow powder which turns red at 180° C. (uncorr.), and chars above 250° C. (uncorr.), and which was found on analysis to have a mercury content of 29.4 per cent. A solution may be prepared for therapeutic use as described in Example VI.

This product has the following structure:

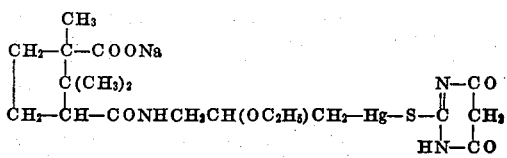

Example XIII

I prepared ethylene diamine thioglycollate by adding a soltuion containing 0.60 gram of ethylene diamine slowly to a solution containing 0.92 gram of thioglycollic acid (mol equivalent amounts). I then added this solution slowly to 50 cc. of a carefully purified aqueous solution of the sodium salt of N(gamma-hydroxy-mercuri - beta - methoxy - propyl) - d - alpha - camphoramic acid which contained 40 mgm. of mercury per cc. I evaporated the resulting solution to dryness at room temperature and reduced pressure in the presence of a desiccant. The product is an amorphous hygroscopic white powder which was found on analysis to have a mercury content of 30.7 per cent. A solution may be prepared for therapeutic use as described in Example VI.

This product has the following structure:

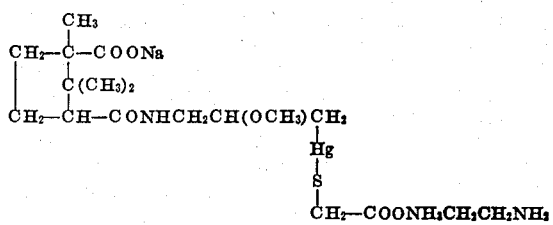

Example XIV 2-carboxy-5-N-(gamma-hydroxymercuri-beta-methoxypropyl) carbamyltetrahydrothiophene (0.518 gm.) was triturated with 30 cc. of water and 2.36 cc. of 0.50 N sodium hydroxide was added. The material dissolved slowly leaving a small amount of gray residue. To this solution (pH 7.2) was added 2.72 cc. of sodium thioglycollate solution (0.0473 gm. sodium thioglycollate per cc.; pH 7.2). The pH of the solution fell to 5.6. This solution was decolorized with activated carbon and evaporated to dryness at 30° C. and 2-5 mm. of mercury. A white hygroscopic solid was obtained which blackens at 172° C. in the melting point bath. The mercury content was found to be 31.7 per cent. This substance may be readily dissolved in water to give a concentration equivalent to 40 mgm. of mercury per cc.

This compound has the following structure:

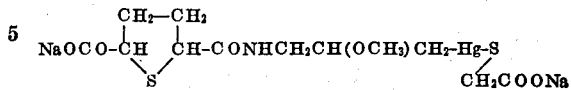

Example XV 2-carboxy-5-N-(gamma-hydroxymercuri-beta-methoxypropyl) carbamyltetrahydrofurane (2.65 gm.) was dissolved in 11.7 cc. of 0.50 N sodium hydroxide solution to give a yellow solution of pH 8.25. To this was added 14 cc. of sodium thioglycollate solution (0.0473 gm. per cc.; pH 7.2). The pH of the resulting solution fell to 5.65. It was treated with activated carbon at room temperature, filtered and evaporated to dryness at 35° C. and 2-5 mm. of mercury to give a white hygroscopic solid. It decomposes at 160° C. with darkening. This material may be readily dissolved in water to give a concentration equivalent to 40 mgm. of mercury per cc. The mercury content was found to be 29.3 per cent.

This compound has the following structure:

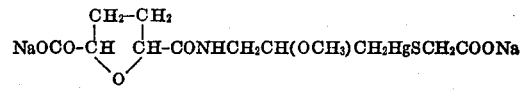

Example XVI

Four grams of 2-carboxy-2'-N-(gamma-hydroxymercuri-beta-methoxypropyl) carbamyl-diphenic acid, was triturated with 10 cc. of water and then 15.6 cc. of 0.50 N sodium hydroxide was added. A solution (pH 9.6) having a very small degree of turbidity was obtained. After filtration, 19.1 cc. of sodium thioglycollate (0.0473 gm. per cc.; pH 7.2) was added. The pH of the resulting solution fell to 9.0. This was evaporated to dryness at 35° C. and 2-5 mm. of mercury to give a white amorphous powder. This material may be readily dissolved in water to give a concentration equivalent to 40 mgm. of mercury per cc. It melts at 163° C. and turns black at about 208° C. The mercury content was found to be 27.2 per cent.

This compound has the following structure:

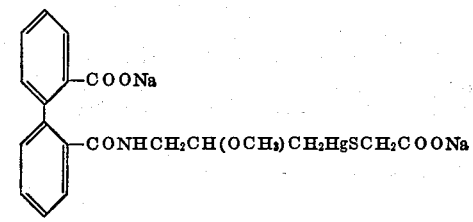

Example XVII

N-(gamma - hydroxymercuri - beta - methoxypropyl) camphoramic acid (5.5 gm.) was triturated with 12 cc. of water and then 22.2 cc. of 0.50 N sodium hydroxide was added. A pale yellow solution of pH 9.5 resulted. To this solution was added 1.56 gm. of redistilled 2-mercaptoethylpyridine (99.8 per cent.) dissolved in 10 cc. of alcohol. The resulting clear solution had a pH of 8.3. It was evaporated to dryness at 35° C. and 2-5 mm. of mercury. The solid so obtained was water insoluble (pH of slurry 7.9). It may readily be dissolved in 50 per cent. aqueous propylene glycol to give a concentration equivalent to 40 mgm. of mercury per cc. The compound decomposes with foaming at 130° C. The mercury content was found to be 30.7 per cent.

This compound has the following structure:

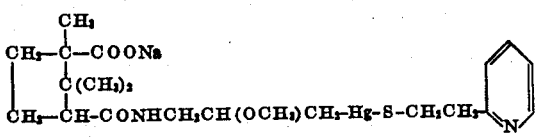

Example XVIII

N-(gamma-hydroxymercuri-beta-methoxypropyl) camphoramic acid (4.88 gm.) was dissolved in 19.7 cc. of 0.50 N sodium hydroxide to give a clear light yellow solution of pH 9.4. To this was added 1.67 gm. of 2-mercaptobenzothiazole. A slurry was obtained which, on addition of 50 cc. of dioxane, formed a clear yellow solution. This solution was then evaporated to dryness at 30–35° C. and 5–10 mm. of mercury. A light yellow amorphous solid was obtained. This material is practically insoluble in water but can be dissolved in 80 per cent. aqueous propylene glycol to give a concentration equivalent to 40 mgm. of mercury per cc. An aqueous slurry has a pH of 5.0. The compound decomposes with blackening at 130° C. The mercury content was found to be 28.8 per cent.

This compound has the following structure:

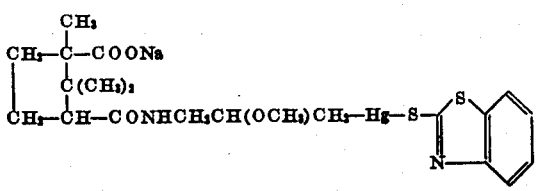

Example XIX

N-(gamma-hydroxymercuri-beta-methoxypropyl) camphoramic acid (4.88 gm.) was dissolved in 19.7 cc. of 0.50 N sodium hydroxide solution to form a clear light yellow solution of pH 9.4. To this solution was added 1.51 grams of 2-mercaptobenzoxazole. A slurry was formed which, on addition of 20 cc. of methyl alcohol, gave a clear pink solution. This was evaporated at 35° C. and 2–5 mm. of mercury to form a pink solid. This material is insoluble in water. An aqueous slurry has a pH of 7.4. It may readily be dissolved in 50 per cent. aqueous propylene glycol to give a concentration equivalent to 40 mgm. of mercury per cc. and in this form would be suitable for oral or intramuscular administration. Decomposes with blackening at 174° C. The mercury content was found to be 29.5 per cent.

This compound has the following structure:

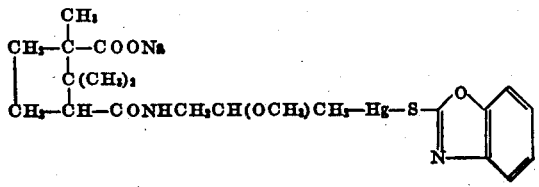

Example XX

Fifty cc. of a solution of N-(gamma-hydroxymercuri-beta-methoxypropyl) camphoramic acid (37.2 mgm. of mercury per cc.) was diluted with 100 cc. of 98 per cent. methyl alcohol. This solution was added to 1.11 gm. of 2-mercaptothiazoline dissolved in 100 cc. of methyl alcohol. The resulting solution was evaporated to dryness at 25° C. and 2–5 mm. of mercury pressure. A white friable solid resulted which is only slightly soluble in water. An aqueous suspension has a pH of 7.04. It readily dissolves in 50 per cent. aqueous propylene glycol to give a concentration equivalent to 40 mgm. of mercury per cc. The compound decomposes with blackening at 110° C. The mercury content was found to be 29.4 per cent.

This compound has the following structure:

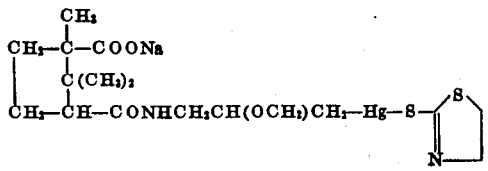

Example XXI

Fifty cc. of a solution of N-(gamma-hydroxymercuri-beta-methoxypropyl) camphoramic acid (37.2 mgm. of mercury per cc.) was diluted with 100 cc. of methyl alcohol. This solution was added to a solution of 1.45 gm. of beta-thionaphthol dissolved in 100 cc. of warm methyl alcohol. The resulting clear light yellow solution was evaporated to dryness at 35° C. and 2–5 mm. of mercury. A white friable solid was obtained which was only slightly soluble in water. An aqueous suspension has a pH of 7.5. The compound readily dissolves in 80 per cent. propylene glycol to give a concentration equivalent to 40 mgm. of mercury per cc. It decomposes with blackening at 120° C. The mercury content was found to be 26.6 per cent.

This compound has the following structure:

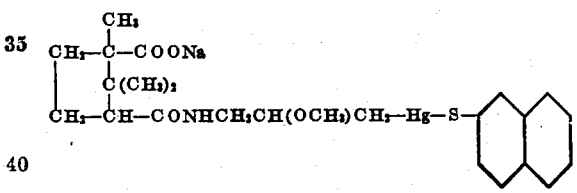

Example XXII

Five gm. of ortho-sulfo-N-(gamma-acetoxymercuri-beta-methoxypropyl) benzamide was dissolved in 45 cc. of water. This solution was treated with one gm. of activated carbon and filtered. There was then added 6.23 cc. of sodium thioglycollate solution (0.0867 gm. thioglycollic acid per cc.; pH 8.5) and the resulting solution (pH 4.2) was evaporated to dryness under reduced pressure. Under these conditions the small amount of acetic acid formed in the reaction is distilled off. The product is an amorphous yellow solid from which an aqueous solution may readily be prepared at pH 7.2 and a concentration equivalent to 40 mgm. of mercury per cc. The product decomposes at 150° C. with blackening and was found to have a mercury content of 27.3 per cent.

This compound has the following structure:

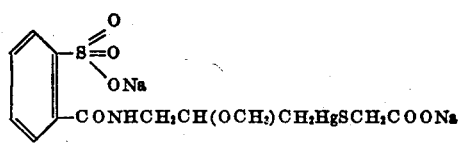

Example XXIII

Five grams of N-(gamma-hydroxymercuri-beta-methoxy-propyl) camphoramic acid was suspended in 15 cc. of water and 2 cc. of 29 per cent ammonium hydroxide solution was added. After solution was substantially complete, suction was applied until the odor of ammonia was almost gone. The solution was then filtered, diluted to 50 cc. and a sample analyzed for mercury. A 0.24 molar solution of sodium thioglycollate was added to the solution of the mercury compound in mol equivalent amount. The pH was adjusted to 7.8 by addition of a few drops of sodium hydroxide whereupon the solution was evaporated to dryness at room temperature in a vacuum. The product solidified into a clear glassy mass which was readily reduced to a white amorphous powder. It was found by analysis to contain 31.5 per cent mercury and 15.1 per cent thioglycollic acid. It gives a clear solution in water which is suitable for parenteral administration. In the melting point bath the compound decomposes at about 115° C.

*Example XXIV*

Five grams of N-(gamma-hydroxymercuri-beta-methoxy-propyl) camphoramic acid and 0.38 gm. of reagent grade calcium hydroxide were suspended in 50 cc. of water and shaken mechanically for several hours. The suspension was filtered and a sample removed and analyzed for mercury. To the filtrate was then added a mol equivalent of 0.24 molar sodium thioglycollate solution. The pH was adjusted with sodium hydroxide and the solution was evaporated to dryness at room temperature in a vacuum. The product dried as a clear glassy mass which was readily reduced to a white amorphous powder. In the melting point bath the compound decomposes at about 206° C. It dissolves easily in water to give a slightly cloudy solution suitable for subcutaneous or intramuscular injection. The product was found by analysis to contain 30.9 per cent mercury and 14.1 per cent thioglycollic acid.

*Example XXV*

A suspension of magnesium hydroxide was prepared by adding sodium hydroxide to magnesium sulfate solution and washing thoroughly to remove soluble salts. To 100 cc. of this suspension was added 5 gm. (1 mol equivalent) of N - (gamma - hydroxymercuri - beta - methoxy-propyl) camphoramic acid. This mixture was shaken mechanically for an hour after which the reactants were almost completely dissolved. It was then filtered and a sample removed and analyzed for mercury. A mol equivalent amount of 0.24 molar sodium thioglycollate solution was then added, the pH was adjusted and the solution evaporated to dryness at room temperature in a vacuum. The product dried as a clear glassy mass which was readily reduced to a white amorphous powder. It decomposed at 160° C. in the melting point bath. The mercury content was found to be 27.8 percent and the thioglycollic acid content 13.1 percent. It dissolves readily in water to give a clear solution which is suitable for injection.

*Example XXVI*

Ortho (gamma-hydroxymercuri-beta-methoxypropyl) phenoxy acetic acid (4.36 gm.) was dissolved in 9.5 cc. of 1.05 N sodium hydroxide solution. To this was added approximately 20 cc. of aqueous sodium thioglycollate solution which contained one molecular equivalent of —SH as determined by iodimetric titration. The solution so obtained was filtered to remove traces of undissolved matter and was then evaporated to dryness under reduced pressure. The product was a pale yellow friable mass which powdered readily. The compound softened in the melting point tube at 125° C. and decomposed at 134° C.

yielding metallic mercury. It is readily soluble in water to give a clear solution. At a concentration of 40 mgm. of mercury per cc. This solution has a pH of 8.3 and may readily be adjusted to 7.5. The mercury content of the dry amorphous powder was found by analysis to be 34.8 percent and the —SH content was 16.0 percent calculated as thioglycollic acid.

This compound has the following structure:

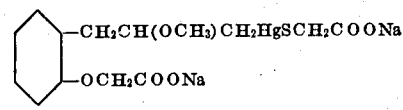

The above examples are only for the purpose of illustrating the invention, and Examples I, II, VI, VII and IX illustrate preferred products. The invention is intended to include the product formed by the reaction of any mercury compound characterized by the group:

with any sulfhydryl compound, or other suitable sulfur compound, wherein the stable —Hg—S— link is formed.

More particularly the invention relates to sulfur-containing mercurial diuretics, including the group:

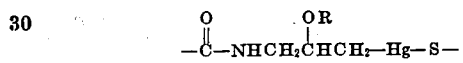

where R is a substituent selected from the group consisting of hydrogen and an alkyl radical, preferably containing not more than six carbon atoms, and where such groups as

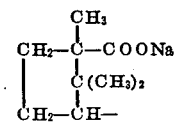

are attached to the carbon atom of the —CON group, and where such groups as,

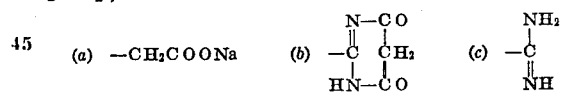

are attached to the end sulfur.

It was pointed out in column 1 of this specification that the Y moiety has been widely varied and known drugs were cited wherein Y was derived from a four carbon acyclic residue (1 example), a cyclo paraffin (1 example), a benzene derivative (3 examples), a nitrogen heterocycle of the pyridine type (2 examples), a nitrogen heterocycle of the pyrimidine type (1 example), and an oxygen heterocycle (1 example). It is highly significant that these compounds are not only effective diuretics but are diuretics of almost identical potency, so that the accepted dosage range for clinical use is the same for all. This statement can be readily supported by references to the pharmacologic and clinical literature. The examples given above have added further support to a broad definition of Y since they include a sulfur heterocycle and a diphenyl derivative. Consequently, it is to be understood that the Y moiety of the new sulfur-containing organic mercury compounds of the present invention may consist of any of the following residues: straight and branched chain hydrocarbons both saturated and unsaturated and their simple substitution products; carbocycles and nitrogen, oxygen and sulfur heterocycles of not over 3 to 4 rings, both saturated and unsaturated and their simple substitution products. By substitution products is implied such groups as —OH, —NH$_2$, —CO, —CN, —NO$_2$, CHO, —OR, ≡PO$_4$, and so forth, commonly found in organic compounds and not such bizarre substituents as As, Bi, Si, which would confer wholly new properties. It should be further understood that Y may give rise to water solubility without the presence of a specific solubilizing group, as when it is derived from a carbohydrate residue or the like.

The stability of the sulfur-mercury bond of these new sulfhydryl compounds may be judged from the following semi-quantitative experiments: To 10 cc. of a solution of the theophylline derivative of the sodium salt of N(gamma-hydroxy - mercuri-beta-methoxy-propyl)-d-alpha-camphoramic acid, containing the equivalent of 40 mgm. of mercury per cc. was added a mol equivalent of various sulfhydryl compounds and carbon dioxide was passed through the solution until a neutral reaction was reached. Because of the greater stability of the sulfur-mercury bond the theophylline was immediately thrown out of solution according to the following equation:

—Hg—(C$_7$H$_7$O$_2$N$_4$) +HSX→
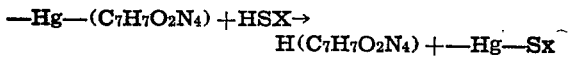
H(C$_7$H$_7$O$_2$N$_4$) + —Hg—Sx

The precipitated theophylline was filtered off, washed with a small volume of ice water, dried, and weighed. In the following table is given the recoveries of theophylline, after making allowance for the known solubility of theophylline in the original solution and in the wash water. The expected recovery of theophylline is, in each case, 0.35 gram.

| Sulfur Compound | Grams Theophylline Found |
|---|---|
| Potassium ethylxanthate | 0.39 |
| N-methyl-thiourea | 0.31 |
| Thiourea | 0.37 |
| Sodium thiosalicylate | 0.41 |
| Thioacetamide | 0.43 |
| Thiophenol | 0.39 |
| Thiouracil | 0.42 |
| Sodium thioglycollate | 0.37 |
| Sodium cystein | 0.38 |
| Sodium thiosulfate | 0.37 |

It will be observed from the foregoing table that the recoveries of theophylline are, in every case, approximately theoretical, which indicates that the reaction goes to completion with respect to the formation of the mercury-sulfhydryl compound and that a mol equivalent of theophylline is accordingly liberated.

Various modifications of this invention will be apparent to those skilled in the art without departing from the spirit thereof, and it is intended to be limited only by the scope of the appended claims.

This application is a continuation-in-part of my co-pending application Ser. No. 578,363, filed February 16, 1945, which has become abandoned subsequently to the filing date hereof.

What I claim is:

1. Water-soluble sulfur-containing organic mercury compounds having diuretic properties and conforming to the general formula $$Y-CH_2\overset{OR}{\underset{}{C}}HCH_2-Hg-S-X$$

wherein Y is a residue of a water-soluble organic compound with a molecular weight below 1000, R is selected from the group consisting of hydrogen and alkyl radicals containing not more than six carbon atoms, and X is a residue of an organic sulfhydryl compound with a molecular weight below 1000 selected from the group consisting of the saturated and unsaturated straight and branch chain hydrocarbons, the saturated and unsaturated carbocycles, the saturated and unsaturated nitrogen, oxygen and sulfur heterocycles of not over four rings and the carbon, hydrogen, oxygen, nitrogen and sulfur-bearing substitution products of the aforesaid hydrocarbons, carbocycles and heterocycles, and is attached to the rest of the molecule through linkage of the sulfhydryl sulfur atom with the mercury atom.

2. Water-soluble sulfur-containing organic mercury compounds as defined in claim 1 wherein Y is a residue of a water-soluble carbocyclic organic compound.

3. Water-soluble sulfur-containing organic mercury compounds as defined in claim 1 wherein Y is a residue of a water-soluble heterocyclic organic compound.

4. Water-soluble sulfur-containing organic mercury compounds as defined in claim 1 wherein Y is a residue of a water-soluble carbamyl compound and is attached to the rest of the molecule by linkage through an amide nitrogen atom.

5. Water-soluble sulfur-containing organic mercury compounds as defined in claim 1, wherein Y is a residue of a water-soluble salt of camphoramic acid and is attached to the rest of the molecule through the amide nitrogen atom.

6. Water-soluble sulfur-containing organic mercury compounds having diuretic properties and conforming to the general formula $$Y-CH_2\overset{OR}{\underset{}{C}}HCH_2-Hg-S-X$$

wherein Y is a residue of a water-soluble organic compound with a molecular weight below 1000 selected from the group consisting of the saturated and unsaturated straight and branch chain hydrocarbons, the saturated and unsaturated carbocycles, the saturated and unsaturated nitrogen, oxygen and sulfur heterocycles of not over four rings and the carbon, hydrogen, oxygen, nitrogen and sulfur-bearing substitution products of the aforesaid hydrocarbons, carbocycles and heterocycles; R is a substituent selected from the group consisting of hydrogen and alkyl radicals containing not more than six carbon atoms, and X is a residue of an organic sulfhydryl compound with a molecular weight below 1000 selected from the group consisting of the saturated and unsaturated straight and branch chain hydrocarbons, the saturated and unsaturated carbocycles, the saturated and unsaturated nitrogen, oxygen and sulfur heterocycles of not over four rings and the carbon, hydrogen, oxygen, nitrogen and sulfur-bearing substitution products of the aforesaid hydrocarbons, carbocycles and heterocycles, and is attached to the rest of the molecule through linkage of the sulfhydryl sulfur atom with the mercury atom.

7. The compound having the formula

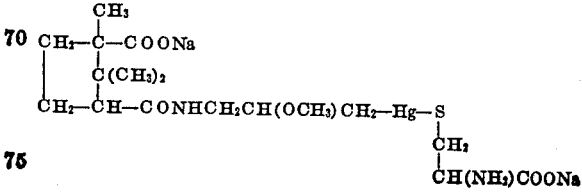

8. The compound having the formula

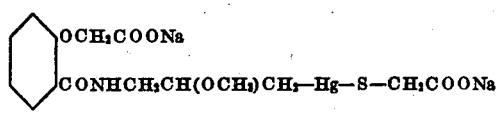

9. The compound having the formula

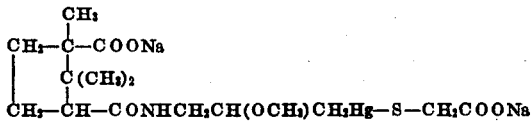

10. The compound having the formula

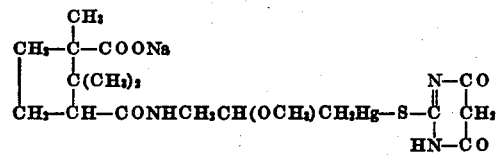

11. The compound having the formula

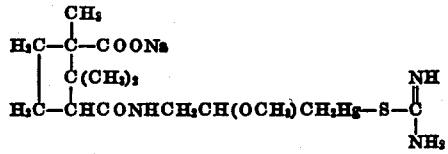

12. The process of producing sulfur-containing organic mercury compounds having diuretic properties and having the general formula

which comprises causing a compound having the formula

to react with a sulfur-containing compound having the formula Q—S—X, Y, R and X having the meanings defined in claim 1 and Q being selected from the group consisting of hydrogen and alkali metals.

13. Water-soluble sulfur-containing organic mercury compounds as defined in claim 1 wherein Y is a residue of a salt of a monocyclic aromatic carboxylic acid which bears a carbamyl group and is attached to the rest of the molecule by linkage through an amide nitrogen atom and X is a residue of a salt of an acyclic mercaptocarboxylic acid attached to the rest of the molecule through linkage of the sulfhydryl sulfur atom with the mercury atom.

ROBERT A. LEHMAN.

REFERENCES CITED

The following references are of record in the file of this patent:

UNITED STATES PATENTS

| Number | Name | Date |
|---|---|---|
| 2,117,901 | Molnar | May 17, 1938 |

OTHER REFERENCES

Lehman: Proc. Soc. Biol. Med., vol. 64, page 428 (1947).